United States Patent [19]
Paimen

[11] 3,828,896
[45] Aug. 13, 1974

[54] BRAKE ADJUSTER
[76] Inventor: Tuomas Paimen, 918 Fir St., Campbell River, B. C., Canada
[22] Filed: Jan. 18, 1973
[21] Appl. No.: 324,894

[52] U.S. Cl......... 188/79.5 SC, 188/196 A, 188/351
[51] Int. Cl............................................. F16d 65/44
[58] Field of Search....... 188/79.55 SC, 196 A, 351, 188/352

[56] References Cited
UNITED STATES PATENTS

| | | | |
|---|---|---|---|
| 2,045,010 | 6/1936 | Goepfrich | 188/79.5 SC |
| 2,140,742 | 12/1938 | Goepfrich | 188/351 |
| 2,153,042 | 4/1939 | Graziano et al. | 188/196 A X |
| 2,619,203 | 11/1952 | Shaw | 188/196 A UX |

Primary Examiner—Duane A. Reger
Attorney, Agent, or Firm—Carver and Company

[57] ABSTRACT

A brake adjuster for adjusting spacing of brake shoes of an automobile brake assembly which includes an adjusting cylinder secured to the brake drum between adjacent ends of the brake shoes opposite the brake cylinder ends thereof, the adjustment cylinder having a cylindrical bore from opposite ends of which project a pair of pistons for engaging the brake shoes. A grease nipple is fitted to adjusting cylinder between the pistons through which a lubricating grease can be injected to move the pistons apart and move the brake shoes into engagement with the drum. The grease nipple is fitted with a screw-type closure valve for closing the grease nipple when the brake shoes are suitably adjusted.

5 Claims, 2 Drawing Figures

BRAKE ADJUSTER

BACKGROUND OF THE INVENTION

1. Field of the Invention

This invention relates to adjusters for adjusting spacing of brake shoes of an automotive brake.

2. Prior Art

Conventional vehicle brakes require adjustment to provide the necessary clearance between the brake shoes and the rotating brake drum. Many types of adjusting devices have heretofore been devised for this purpose, some of which devices have been mechanical and involve screw type expansion means. Others have used hydraulic means for providing expansion and adjustability.

Mechanical brake adjusters are subject to corrosion, particularly in areas where salt is extensively used for snow and ice removable purposes on highways and the adjustment means invariably seize, which usually requires removal of the brake drum and replacement of the adjusting means which, if corrosion is very bad, can prove very difficult.

Hydraulically operated adjusting devices of prior art have not proved entirely effective as they are relatively costly and difficult to install.

Furthermore most adjusting devices of prior art require the attention of experienced mechanics.

SUMMARY OF THE INVENTION

The present invention provides a brake adjusting device which is simple of operation and simple to install which avoids the problems of corrosion normally associated with mechanical adjusting devices.

The adjusting device of the present invention, furthermore, is relatively simple to manipulate and enables a brake adjustment to be carried out by inexperienced personnel whenever the vehicle requires greasing.

The adjusting device of the present invention includes a cylinder having an axial bore adapted to be secured between adjacent ends of a pair of brake shoes, a pair of pistons project from opposite ends of the bore adapted to be connected to adjacent ends of the brake shoes, a means opening into the bore between the pistons through which lubricating grease can be ejected for moving the pistons apart and means for closing the first mentioned means to the return of grease thereto.

Detailed description following related to drawings gives exemplification of preferred embodiment of the invention which, however, is capable of expression in structure other than particularly described and illustrated.

DETAILED DESCRIPTION

Figure 1:
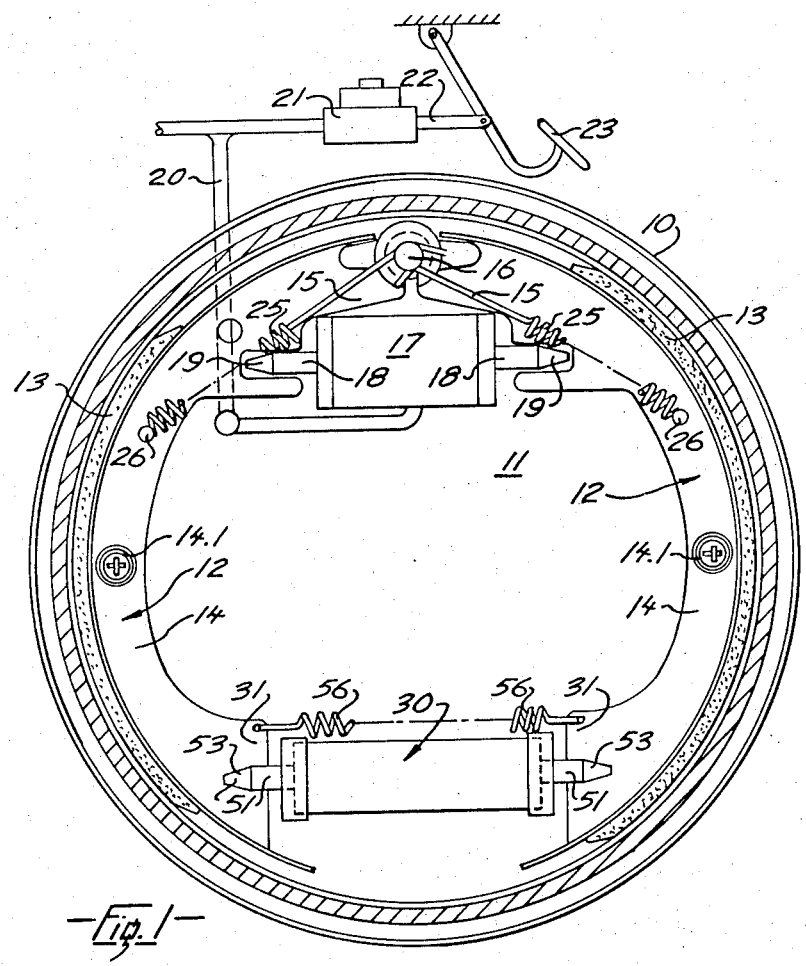
FIG. 1 is a side elevation view of a vehicle brake with the brake drums shown in cross section to show related parts thereof and the brake adjuster of the present invention.

A conventional brake assembly shown in FIG. 1 has a brake drum 10 which is fixed to a wheel, not shown, of an automotive vehicle for rotation therewith adjacent a stationary backing plate 11.

Mounted inside the drum is a pair of conventional brake shoes 12—12 which have peripheral brake linings 13—13 and central stiffening webs 14—14 and are slidably secured to the locking plate by conventional anchor pins and springs 14.1–14.1. A pair of adjacent ends 15—15 of the brake shoes is mounted on an anchor pin 16 projecting from the backing plate 11. Connection between the anchor pin and the ends 15—15 of the brake shoes is such as to permit expansive movement of the brake shoes.

A wheel cylinder 17 which is secured to the backing plate 11 has a pair of pistons 18—18 projecting from opposite ends, the pistons having bifurcated ends 19—19 which embrace the stiffening webs 14—14 at the ends 15—15. The wheel cylinder 17 is connected through fluid conduit 20 to a master cylinder 21 the operating piston 22 which is operated by a conventional foot peddle 23. Hydraulic fluid ejected from the master cylinder, upon operation of the foot peddle, is injected into the wheel cylinder so as to extend the pistons and move the shoes into contact with the brake drum against the action of retractor springs 25—25 each of which is anchored at one end on the anchor pin 16 and at an opposite end in a suitable perforation 26 in the stiffening webbing.

A brake adjusting device, generally 30, is anchored to the backing plate between opposite adjacent ends 31—31 of the brake shoes.

The device 30 includes a cylinder 32 which has a straight axial bore 33.

Figure 2:
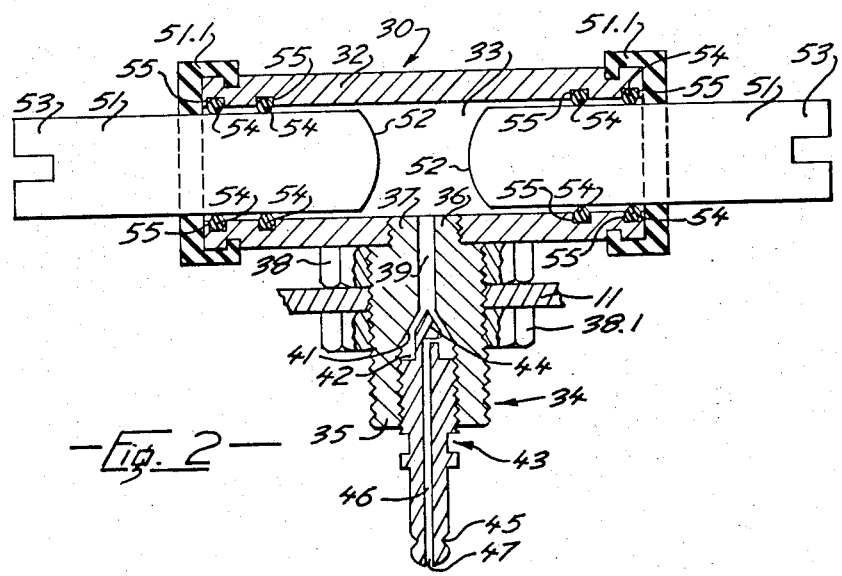
FIG. 2 is an enlarged cross section view taken on line 2—2 FIG. 1.

The cylinder 32 secured to the backing plate by a valve assembly 34, see FIG. 2. The valve assembly has an externally threaded sleeve 35 one end 36 of which is threaded into a tapped opening 37 centrally of the ends of the cylinder 32. The sleeve 35 projects through a suitable hole in the backing plate and is adjustably secured by nuts 38 and 38.1. The sleeve has a central passage 39 which opens at one end into the bore 33 of the cylinder 32 and opens at it's other end into a conical seat 41 which constitutes the inner end of a larger diameter internally threaded valve passage 42. A cylindrical valve element 43 is threaded into the valve passage 42 and has a conical inner end 44 which matches the conical seat 41, and an outer end which is formed as a grease nipple 45. The valve element also has an axial grease passage 46 which opens at one end 47 short of the conical end 44 and opens at the other end through the nipple 45. The valve element can be rotated by a spanner or the like.

A pair of cylindrical pistons 51—51 extends into opposite ends of the bore 33 and has inner spherical ends 52—52 and bifurcated outer ends 53—53. O-rings, severally 54, are arranged in spaced pairs in suitable grooves severally 55 adjacent opposite ends of the bore 33 for sealing engagement with the pistons 51—51. Rubber duct covers 51.1—51.1 fit in exterior grooves adjacent ends of the cylinder 32. The bifurcated ends 53—53 of the pistons 51—51 embrace the stiffening webs at the ends 31—31 of the shoes in the same manner as effected by the pistons of the wheel cylinder.

A light spring 56 which extends under tension between the ends 31—31 of the brake shoes maintain the brake shoes securely against the bifurcated ends of the pistons 51—51.

OPERATION

Prior to installation on a vehicle the adjuster is filled with heavy lubricating grease by removing the piston and injecting grease through the valve until the cylinder is entirely full. The pistons are then reinserted and shoved together, the excess grease being ejected through the valve. This ensures that air is not trapped in the cylinder.

In adjusting the brake shoes the valve element is backed off slightly from the conical seat 41 and lubricating grease is then ejected through the valve element by a conventional grease gun until the shoes are pressed firmly outwards against the brake drum. The grease gun is then removed and the wheel to which the brake drum is secured is then rotated several times. This relieves brake pressure as excess grease is ejected back through the valve assembly. When the required clearance is obtained the valve element is then screwed in against the conical seat to close the passage 39 so as to prevent inward movement of the pistons 51—51.

It is seen that brake adjustment is easily effected and furthermore as inner ends of the pistons 51—51 are spherical even though the pistons should, when the cylinder is initially filled, be touching each other they will not extend across and close the passage at 39.

I claim:

1. In combination with an automotive brake having a stationary backing plate, a rotatable brake drum, a pair of brake shoes mounted on the backing plate for expansive movement, and operating means connected to a pair of adjacent ends of the brake shoes for selectively controlling expansive and retractive movement of the brake shoes, a brake adjuster for adjustably positioning the opposite ends of the brake shoes including a. a cylinder having an axial bore secured to the backing plate,
   b. a pair of pistons slidably mounted in the bore and having outer ends engaging said opposite ends of the brake shoes,
   c. a passage through the cylinder ported at its inner end into the bore between the pistons,
   d. valve means having a grease nipple for receiving a discharge end of a grease gun mounted in the passage of each cylinder being openable to enable lubricating grease to be injected into each cylinder individually so as to spread the pistons of each cylinder apart and closable to lock the pistons against relative movement in the cylinder bore.

2. A brake adjuster as claimed in claim 1 in which the valve means includes:

a. a sleeve having a central passage opening at one end into the cylinder between the pistons and opening at its other end into a conical seat,
   b. a valve element threaded into the passage for movement into sealing engagement with the conical seat, the valve element having an axial lubricant passage opening at one end short of the inner end of the valve element and opening at the outer end through the grease nipple.

3. A brake adjuster as claimed in claim 1 including a tension spring connecting said opposite ends of the brake shoes for maintaining the brake shoes in contact with the pistons.

4. A brake adjuster as claimed in claim 1 in which the inner ends of the pistons are spherical in shape.

5. A brake adjuster as claimed in claim 1 including O-rings located in spaced pairs adjacent opposite ends of the cylinder for effecting sealing engagement with the pistons.

* * * * *